Figure 1:
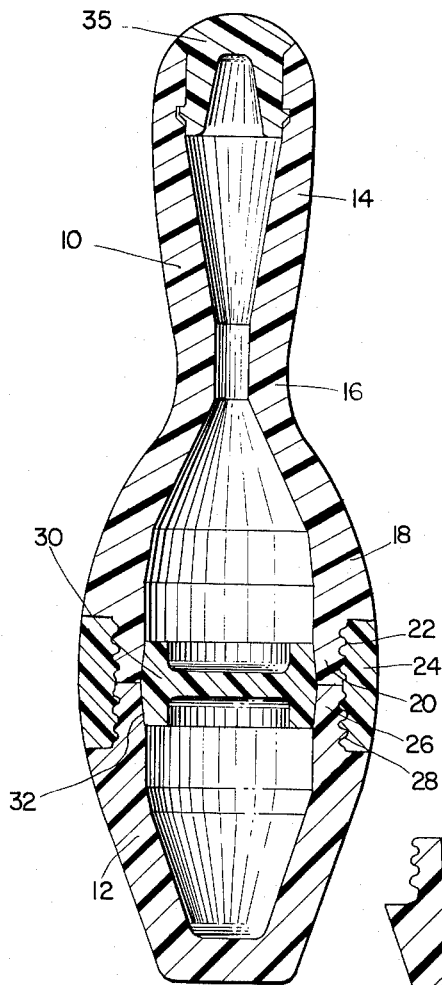

Jan. 25, 1966  H. H. WANDERS  3,231,274

MULTI-PART PLASTIC BOWLING PIN

Filed Nov. 23, 1962

*INVENTOR.*
HANS H. WANDERS

BY Morse & Altman

ATTORNEYS

United States Patent Office 3,231,274
Patented Jan. 25, 1966

3,231,274
MULTI-PART PLASTIC BOWLING PIN
Hans H. Wanders, 160 Prospect St., Hingham, Mass.
Filed Nov. 23, 1962, Ser. No. 239,632
3 Claims. (Cl. 273—82)

Figure 3:
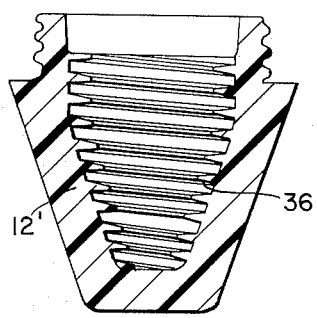
Figure 2:
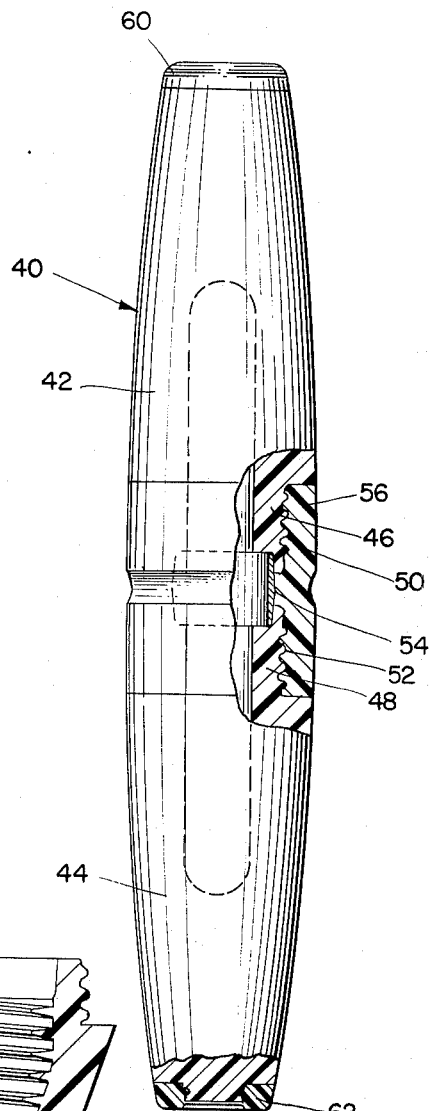

This invention relates to a composition bowling pin which may be made in any variety, such as a ten-pin, a duckpin, or a candlepin. An object of the invention is to make a pin chiefly or wholly of plastic materials, which pin will be an acceptable substitute for the standard wooden pin but will be far more durable. Through many years of use, bowlers have become accustomed to pins made of wood, usually maple, so that to be acceptable, especially for tournament use, any substitute for standard wooden pins must have approximately the same weight as the standard pins. The substitute pins must be able to withstand the battering blows from the bowling balls which they will receive when in use. The development of high-density polyethylene has provided a material having superior qualities of toughness and resistance to fracture and abrasion. Owing to the high density of this material a bowling pin made largely of it must have a hollow of considerable volume so that the weight of the entire pin will approximate that of the customary wooden pin. To facilitate the manufacture of pins using such material, I mold a plurality of parts and assemble them as hereinafter described, the parts being illustrated on the drawing, of which FIGURE 1 is a sectional view of a bowling pin embodying the invention;

FIGURE 2 is an elevational view, with part broken away to show in section, of a candle-pin embodying the invention; and FIGURE 3 is a sectional view of a modified form of one of the parts shown in FIGURE 1.

The pin shown in FIGURE 1 is composed of two principal parts 10, 12 which are of tough synthetic resin material such as high-density polyethylene having a very high molecular weight. Examples of this material now on the market are known as "Hi-Fax" 1900 Series, the specific gravities of which are 0.940 to 0.942. The upper part 10 is hollow and may include the head 14, neck 16 and upper body 18 portions of the pin. At the lower end of this part is a portion 20 of reduced diameter, the outer surface of which is preferably made with circumferential ridges 22 to interlock with the third part 24 hereinafter described. The lower part 12 is cup-shaped with a top portion 26 of reduced diameter having circumferential ridges 28 similar to the ridges 22.

The parts 10, 12 are separately molded, then are assembled end-to-end with a buttressing disk 30 fitted within the mutually abutting ends of the reduced portions 20, 26 of the parts. The rim of the disk may be flanged in both directions to provide a greater peripheral surface 32 which is slightly tapered in both directions to fit within the reduced portions 20, 26 the inner surfaces of which are slightly chamfered for the purpose of holding the disk 30 in place when the parts are assembled. The disk 30 is separately made of any desired material having sufficient compressive strength such as a plastic or metal. The parts 10, 12, 30 are assembled in a suitable mold wherein a circumferential band 24 is molded by injection to embrace the end portions of the principal parts 10, 12. The material used for molding the band 24 may be any suitable synthetic resin which is capable of being injection molded. For example, ordinary polyethylene may be used. The injected material enters the valleys between the ridges 22, 28 and locks the parts 10, 12 securely together. The disk 30 backs the reduced portions 20, 26 of the parts 10, 12 and supports them against the high injection pressures of the material introduced to form the part 24. The upper end of the member 10 is closed by a plug 35 of any suitable material such as polyethylene.

In molding the member 12 a core is used to form the hollow interior, the core being easily removed because it is tapered. If inner ribs 36 are desired to reinforce the lower member, the upper member, or both, the ribs are made in the form of a continuous screw thread so that the core (not shown) can be removed by rotation. FIGURE 3 shows such ribs in a lower member 12.

A candle-pin 40 can be made by assembling parts some of which have previously been made by molding or otherwise. As indicated in FIGURE 2, the two principal parts are upper and lower parts 42, 44 preferably made of a high-density polyethylene such as is used in making the parts 10, 12 of the pin shown in FIGURE 1, the parts 42, 44 being made with hollows of sufficient size to compensate for the density of the plastic as compared with that of wood. The parts 42, 44 have an end portion 46, 48 respectively, of reduced diameter with circumferential ribs 50, 52 on the outer surfaces. The parts 42, 44 are assembled in a mold (not shown) with an inner cylinder 54 of metal or other suitable material. A central band 56 of ordinary polyethylene or the like is injection molded around the portions 46, 48 as indicated on the drawing. End caps 60, 62 are molded or mounted on the ends of the pin to be replaced when worn.

I claim:

1. A multi-part bowling pin comprising two separate hollow principal parts of high-density snythetic plastic material arranged in end-to-end abutting complementary relation defining a substantially hollow body, buttressing member within said body extending within and engaging the inner surfaces of the mutually adjacent end portions of each of said principal parts, and securing means including a circumferential band of synthetic plastic engaging and embracing each of said end portions of said principal parts, securing said parts in assembled relation.

2. A bowling pin as defined by claim 1, wherein said principal parts are constructed of high-density polyethylene.

3. A multi-part bowling pin of the candle type comprising two separate cup-shaped principal parts of high-density polyethylene arranged in end-to-end relation to define a cavity therewithin, each of the mutually adjacent end portions of said parts being of reduced exterior diameter and including peripheral ridges, a buttressing member within said cavity engaging the inner surfaces of each of said end portions, and means defining a band surrounding and in interlocking engagement with said peripheral ridges for securing each of said principal parts in assembled relation.

References Cited by the Examiner

UNITED STATES PATENTS

| | | | |
|---|---|---|---|
| 820,490 | 5/1906 | Goff et al. | 273—82 |
| 1,053,654 | 2/1913 | Seidel | 273—82 |
| 1,053,957 | 2/1913 | Seidel | 273—82 |
| 1,131,090 | 3/1915 | Seidel et al. | 273—82 |
| 1,144,078 | 6/1915 | Stanley | 273—82 |
| 1,491,279 | 4/1924 | Stewart | 273—82 |
| 1,969,378 | 8/1934 | McKenzie | 273—82 |
| 2,568,274 | 9/1951 | Clark | 273—82 |
| 2,737,391 | 3/1956 | Brinkman | 273—82 |
| 3,025,061 | 3/1962 | Ernst et al. | 273—82 |
| 3,098,655 | 7/1963 | Martin | 273—82 |

RICHARD C. PINKHAM, Primary Examiner.

DELBERT B. LOWE, Examiner.